United States Patent [19]

Gérault

[11] Patent Number: 4,666,487
[45] Date of Patent: May 19, 1987

[54] APPARATUS FOR REMOVING DUST FROM THE ATMOSPHERE AROUND A TUBE

[75] Inventor: Patrice Gérault, Puteaux, France

[73] Assignee: Compagnie Lyonnaise de Transmissions Optiques, SA, Clichy, France

[21] Appl. No.: 793,669

[22] Filed: Oct. 31, 1985

[30] Foreign Application Priority Data

Oct. 31, 1984 [FR] France ................... 84 16689

[51] Int. Cl.$^4$ .......................................... C03B 37/027
[52] U.S. Cl. ........................... 65/11.1; 55/DIG. 18; 65/2; 65/3.12; 65/13; 65/27
[58] Field of Search ................ 65/2, 13, 27, 3.11, 65/11.1; 55/355, 502, DIG. 18

[56] References Cited

U.S. PATENT DOCUMENTS 4,050,368  9/1977  Eakes ......................... 55/DIG. 18
4,127,106 11/1978  Jensen ........................ 55/DIG. 18
4,317,667  3/1982  Spainhour ............................. 65/27
4,390,357  6/1983  Myers et al. .......................... 65/2

OTHER PUBLICATIONS

Microvoid CLF Air Control Inc. 125 Noble St., Norristown, PA 19401 5M-3/66.

Primary Examiner—Robert Lindsay
Attorney, Agent, or Firm—Kenyon & Kenyon

[57] ABSTRACT

Apparatus for removing dust from the atmosphere around an externally heated tube (1) having a deposit being made on its inside surface from a vapor phase, said dust being removed by setting up a laminar flow of dust-free air around the tube. The apparatus includes members (7, 8, 9, 10) for setting up laminar air flows in planes parallel to the axis of the tube and on either side thereof, together with members (15, 16) for setting up flows of air perpendicularly to the axis of the tube and on either side thereof.

9 Claims, 3 Drawing Figures

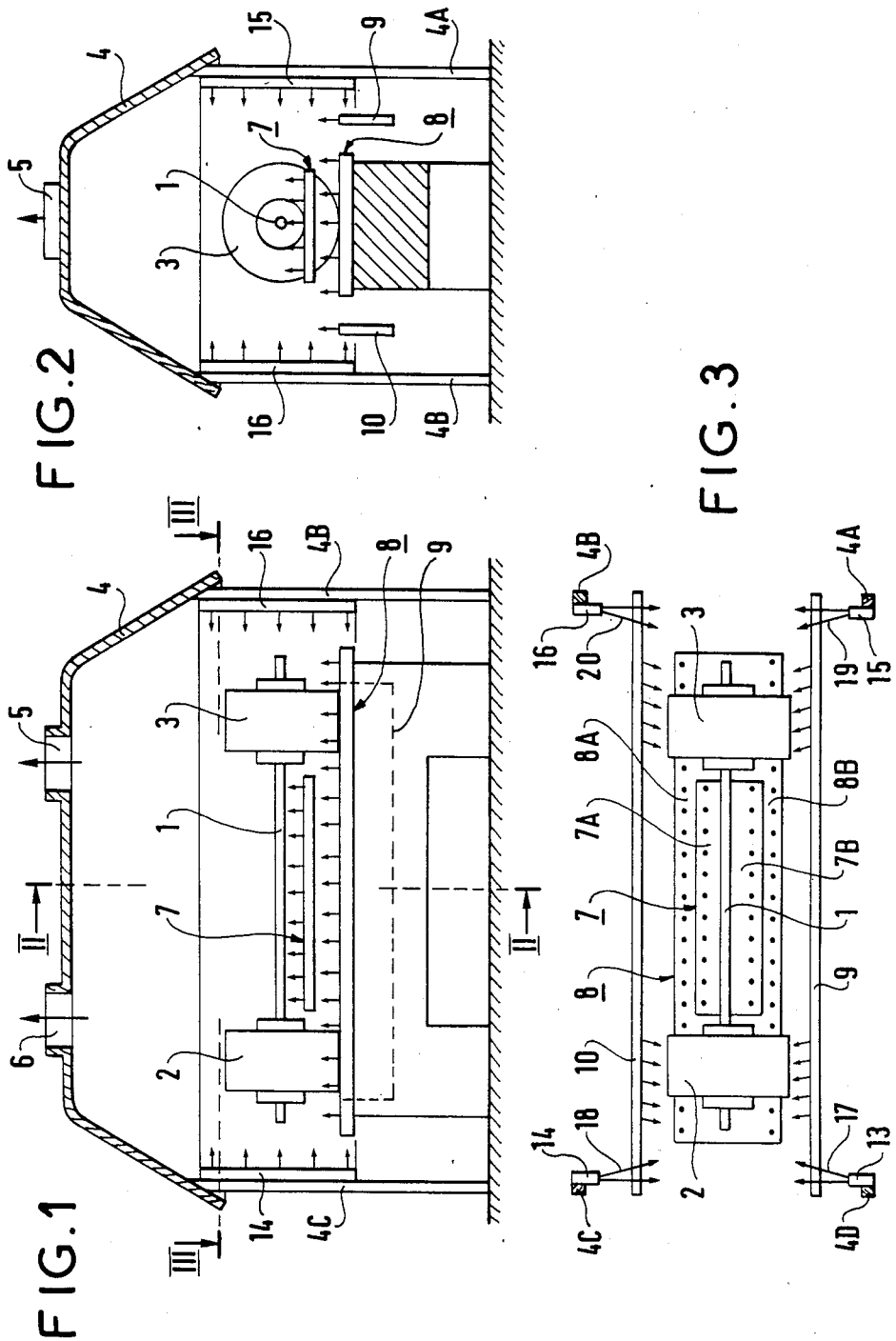

APPARATUS FOR REMOVING DUST FROM THE ATMOSPHERE AROUND A TUBE

The present invention relates to apparatus for removing dust from the atmosphere around an externally heated tube having a deposit being made on its inside surface from a vapor phase, said dust being removed by setting up a laminar flow of air around the tube.

BACKGROUND OF THE INVENTION

Proposals have already been made in U.S. Pat. No. 4,390,357 concerning apparatus for removing dust from the atmosphere around a drawing machine for drawing an optical fiber preform, the apparatus setting up a laminar flow of air along successive enclosures surrounding the preform, the bare optical fiber, and then the optical fiber covered with a protective coating. Merely setting up a laminar flow of air over one of the sides of the preform, as described in said document, is not enough to provide adequate protection of a tubular preform while a deposit is being formed therein with the preform being periodically heated from one end to the other, and any impurity contained in the ambient atmosphere may deposit itself on the outside surface of the preform which will give rise to non-uniformities in the structure of the preform and consequently in its mechanical strength.

Preferred implementations of the present invention provide apparatus for removing dust from the atmosphere around a tube, which apparatus is capable of providing substantially complete protection of the outside surface of the tube against any impurity being deposited thereon, and, in the specific case of manufacturing optical fibers by drawing a preform, preferred implementations of the present invention provide an optical fiber having a highly uniform structure.

SUMMARY OF THE INVENTION

The present invention provides apparatus for removing dust from the atmosphere around an externally heated tube having a deposit being made on its inside surface from a vapor phase, said dust being removed by setting up a dust-free laminar flow of air around the tube, and the apparatus including the improvement whereby it includes members for setting up laminar flows of air in planes which are parallel to the axis of the tube and are located on either side thereof, together with members for setting up a flow of air perpendicularly to the axis of the tube, and on either side thereof.

When the tube has a horizontal axis, in a preferred variant of the invention, the members for setting up laminar air flows in planes parallel to the axis of the tube point upwardly.

Apparatus in accordance with the invention preferably further includes, close to the ends fo the tube, orifices for setting up a flow of air which is oblique relative to the axis of the tube and inclined towards the central zone of the tube. Said inclination is preferabl adjustable.

BRIEF DESCRIPTION OF THE DRAWING

An embodiment of the invention is described by way of example with reference to the accompanying drawing, in which:

FIG. 1 is a diagrammatic side elevation of the apparatus;
FIG. 2 is a section on line II—II of FIG. 1; and
FIG. 3 is a section on line III—III of FIG. 1.

MORE DETAILED DESCRIPTION

The figures show apparatus for removing dust from the atmosphere around a tubular preform intended for manufacturing an optical fiber, the preform being externally heated and having reactive gases inserted therein in order to make a deposit on its inside surface of doping elements suitable for providing an optical fiber whose refractive index varies radially in a predetermined manner.

The tube 1 made of silica or glass and intended to constitute the preform has its ends resting on bearings disposed on suports 2 and 3 and provided with rotary drive means such that the assembly constitutes a glassmaker's lathe. For the purposes of increasing clarity in the drawings, ducts for supplying the inside of the tube with reactive gases and a moving member for heating the outside surface of the tube (eg. a gas burner) have not been shown in the figures. The tube and the members for supplying dust-free air which are described below are disposed under a hood 4 which is generally rectangular in shape and is supported on posts such as 4A, 4B, 4C and 4D. This hood has orifices 5 and 6 for evacuating the dust-removing air and the combustion gases from the burner.

Two hoods may optionally be provided, in which case a first hood is disposed over the central portion of the glassmaker's lathe and the second hood is wider than the first and is intended to receive the protective air flow taking place further away on either side of the tube being processed.

A first windbox 7 has orifices 7A, 7B passing therethrough for supplying dust-free air on either side of the tube, close to the tube, parallel to the tube axis, and along the entire zone of the tube which is subjected to heating. The orifices are vertically-directed. The windbox is supplied with air from which the dust has been filtered using a "class 100" filter or better, as defined by American standard No. 209B dated 24 Apr. 1973. This air is caused to move with a laminar flow at a speed of about 0.4 to 0.5 meters per second (m/s).

In order to provide further protection for the tube against impurities, a second windbox 8 provided with orifices 8A and 8B for supplying dust-free air in a vertical laminar flow is likewise disposed to have orifices on either side of the tube, to extend parallel to the tube axis, but at a greater distance therefrom than the windbox 7. The windbox 8 extends lengthwise beyond the bearing supports. Under many circumstances, the protection provided by the windbox 7 is sufficient.

The protection of the tube is reinforced by longitudinal windboxes 9 and 10 together with perforated side grilles. 13, 14, 15 and 16 for setting up flows of dust-free air perpendicularly to the axis of the tube and on either side thereof. These windboxes and grilles are supplied with air via vertical ducts 13', 14', 15' and 16'. The air is caused to flow through the grilles at a higher speed so that the resulting flow is turbulent. Orientable nozzles are disposed at the ends of the grilles in order to direct a portion of the flow obliquely relative to the tube axis at an angle of inclination towards the central zone which is selected in such a manner as to prevent any dust-bearing air from penetrating via the ends of the glassmaker's lathe, and this is shown diagrammatically by arrows 17, 18, 19 and 20.

It will be understood that the invention is also applicable when the preform-constituting tube is disposed vertically, in which case the jets of laminar air flow will be horizontal.

I claim:

1. An apparatus for removing dust from a space around an elongated workpiece having a longitudinal axis, a central zone, and two opposite ends, the apparatus including means for providing a laminar flow of dust-free air around the workpiece, wherein the improvement comprises:

said means for providing a laminar flow of dust-free air includes means for delivering at least two laminar flow curtains of dust-free air transversely to the axis of the workpiece in respective spaced-apart planes parallel to each other and to the axis of the workpiece, one plane on one side of the workpiece and the other plane on an opposite side of the workpiece and the apparatus further comprises means for delivering at least two additional curtains of dust-free air flowing in respective spaced-apart planes parallel to each other and perpendicular to the axis of the workpiece, one of the additional curtains being located near one end of the workpiece and the other of the additional curtains being located near the other end of the workpiece.

2. An apparatus according to claim 1, wherein the longitudinal axis of the workpiece is substantially horizontal, and the means for delivering at least two laminar flow curtains of dust-free air in respective parallel planes are oriented to deliver said laminar flow curtains upwardly.

3. An apparatus according to claim 2 further comprising orifices located near the two ends of the workpiece, said orifices being directed towards the control zone of the workpiece for delivering flows of air obliquely relative to the axis of the workpiece and inclined towards the central zone of the workpiece.

4. An apparatus according to claim 3, wherein said orifices for delivering flows of air obliquely relative to the axis of the workpiece are angularly adjustable.

5. An apparatus according to claim 1, wherein said orifices for delivering flows of air obliquely relative to the axis of the workpiece are angularly adjustable.

6. An apparatus according to claim 5, wherein said orifices for delivering flows of air obliquely relative to the axis of the workpiece are angularly adjustable.

7. An apparatus for removing dust from an unenclosed space containing a workpiece, the apparatus comprising:

a windbox means having a surface pierced with at least two spaced-apart parallel rows of orifices for delivering laminar dust-free air in first and second parallel planes substantially perpendicular to said surface;

two spaced-apart parallel pairs of elongated side grille means, one parallel pair of side grille means extending in a third plane perpendicular to the first and second planes and the other parallel pair of side grille means extending in a fourth plane parallel to and spaced from the third plane, and each side grille means of a pair having at least one longitudinal row of perforations facing a corresponding row of perforations in the other side grille means of the pair for delivering opposing streams of dust-free air substantially parallel to said surface of the windbox means in the respective third and fourth planes, said first, second, third and fourth planes intersecting to define a rectangular space; and hood means disposed in spaced relation to said surface of the windbox means for exhausting air from said rectangular space; and means for mounting a workpiece within said rectangular space between said surface of the windbox means and said hood means.

8. An apparatus according to claim 7, wherein said surface of the windbox means is substantially horizontal and faces upwardly.

9. An apparatus according to claim 7, wherein the flow of said opposed streams of dust-free air from the perforations of each pair of side grille means is turbulent.

* * * * *